(12) United States Patent
Basu

(10) Patent No.: US 11,861,222 B2
(45) Date of Patent: Jan. 2, 2024

(54) OBJECT MANAGEMENT IN TIERED MEMORY SYSTEMS

(71) Applicant: Micron Technology, Inc., Boise, ID (US)

(72) Inventor: Reshmi Basu, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/322,235

(22) Filed: May 17, 2021

(65) Prior Publication Data
US 2022/0365720 A1    Nov. 17, 2022

(51) Int. Cl.
*G06F 3/06* (2006.01)
*G06F 12/0882* (2016.01)

(52) U.S. Cl.
CPC .......... *G06F 3/0659* (2013.01); *G06F 3/0619* (2013.01); *G06F 3/0653* (2013.01); *G06F 3/0688* (2013.01); *G06F 12/0882* (2013.01)

(58) Field of Classification Search
CPC .... G06F 3/0659; G06F 3/0619; G06F 3/0653; G06F 3/0688; G06F 12/0882
See application file for complete search history.

(56) References Cited

U.S. PATENT DOCUMENTS

| | | | |
|---|---|---|---|
| 9,075,710 B2 | 7/2015 | Talagala | |
| 10,141,050 B1* | 11/2018 | Kannan | G06F 3/0656 |
| 10,924,587 B1* | 2/2021 | Chaudhuri | G06F 16/214 |
| 2010/0037012 A1* | 2/2010 | Yano | G06F 3/0679 |
| | | | 711/E12.008 |
| 2014/0136758 A1 | 5/2014 | Sprouse et al. | |
| 2014/0379631 A1* | 12/2014 | Sebastian | G06F 16/245 |
| | | | 707/607 |
| 2015/0074341 A1 | 3/2015 | Marukame et al. | |
| 2016/0196207 A1* | 7/2016 | Gupta | G06F 3/0652 |
| | | | 711/103 |
| 2020/0097367 A1* | 3/2020 | Kim | G06F 12/0246 |
| 2020/0333981 A1* | 10/2020 | Liu | G06F 3/0659 |
| 2021/0064585 A1* | 3/2021 | Chen | H04L 9/0894 |
| 2021/0141736 A1* | 5/2021 | Manzanares | G06F 12/1009 |

* cited by examiner

*Primary Examiner* — Eric Cardwell
(74) *Attorney, Agent, or Firm* — Brooks, Cameron & Huebsch, PLLC

(57) ABSTRACT

Systems, apparatuses, and methods related to object management in tiered memory systems are discussed. An example method can include writing a memory object to a first memory device of a first type of memory medium. The example method can include determining that a size of the memory object meets or exceeds a threshold data size. The example method can include writing the memory object to a second memory device that comprises a second type of memory medium different than the first type. The first memory medium can be a non-volatile memory comprising phase-change memory or resistive random access memory (RAM) and the second memory medium can be NAND Flash or NOR Flash.

20 Claims, 5 Drawing Sheets

OBJECT MANAGEMENT IN TIERED MEMORY SYSTEMS

TECHNICAL FIELD

The present disclosure relates generally to memory objects, and more particularly, to apparatuses, systems, and methods for object management in tiered memory systems.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1A:
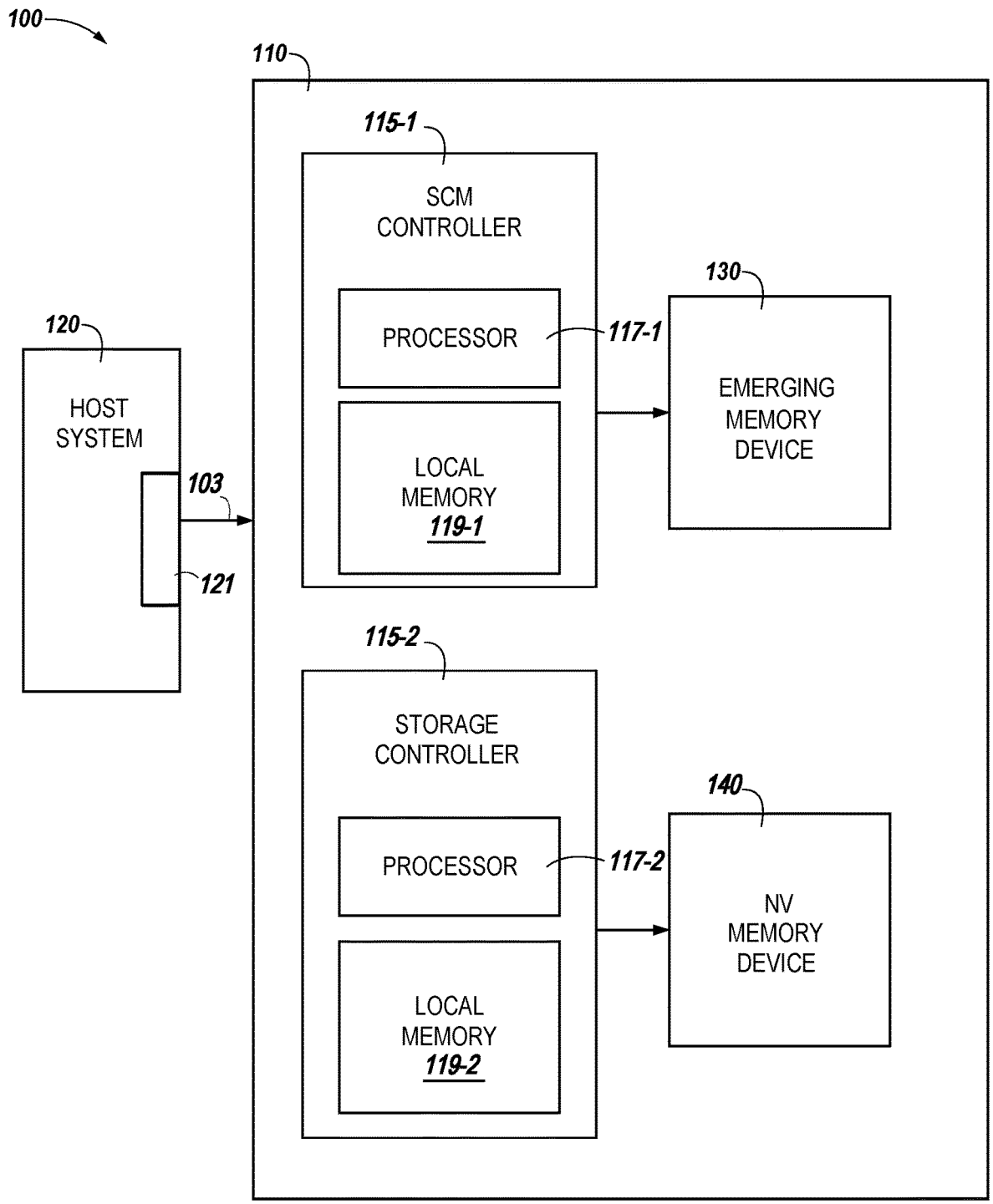
FIG. 1A is a block diagram in the form of a computing system including controllers and respective memory devices in accordance with a number of embodiments of the present disclosure.

Systems, apparatuses, and methods related to object management in tiered memory systems are described. An example method can include writing a memory object to a first memory device of a first type of memory medium. The example method can include determining that a size of the memory object meets or exceeds a threshold data size. The example method can include writing the memory object to a second memory device that comprises a second type of memory medium different than the first type. The first memory medium can be a non-volatile memory comprising phase-change memory or resistive random access memory (RAM) and the second memory medium can be NAND Flash or NOR Flash.

In some embodiments, the first memory device can include a first type of memory medium including an emerging memory device, such as a three-dimensional (3D) crosspoint memory, a phase-change memory, resistive random access memory (RAM), etc. A second memory device can include a second type of memory medium including NAND Flash or NOR Flash. The memory system can include an address space that is split between or contiguous across the first memory device and the second memory device. As an example, the address space can span both the first memory device and the second memory device. A memory object to be stored in the memory system can be associated with a particular address location in the address space irrespective of which of the first memory device and the second memory device the memory object is stored in.

Embodiments described herein can further include writing each of a plurality of memory objects to one of a first memory device and a second memory device. A particular one of the plurality of memory objects can be written (e.g., transferred) to another of the second memory device or the first memory device, respectively, in response to a size of the particular one memory object being a threshold data size. As an example, data associated with a memory object can be written to a first memory device, such as an emerging memory device. When the data of a memory object reaches a threshold data size, such as a page size of a flash-based memory device, the memory object and the data can be transferred to the non-volatile memory device. In this way, smaller portions of data can be initially written to the emerging memory device and when the smaller portions of the data are able to be combined to be a full flash-based page size (e.g., a NAND page size), the combined data can be transferred to the flash-based memory device.

In an example, data associated with the memory object can be written to a second memory device, such as a non-volatile memory device which can include a flash-based memory device. When the data of the memory object is requested by a host from the flash-based (e.g., NOR or NAND) memory device, the data can be accessed from the flash-based memory device if the data is a same data size as a page size, or within a threshold range of the page size. Further, when the data is requested by the host, if the data is a smaller data size than the page size, or a threshold data size, the data can be written to (e.g., transferred to) the emerging memory device prior to being accessed by the host. In this way, data of a smaller data size can be accessed from the emerging memory device where smaller portions of data can be accessed without accessing a full page size of data. In an approach where the data remains in the flash-based memory device, the host may be accessing a full page size of data in order to access a portion of data that is smaller than the full page size, thereby transferring data that has not been requested by the host and consuming unnecessary resources of the memory system.

As used herein, the term "memory object" and variants thereof, generally refer to a contiguously addressed region of data that is uniquely identified on the device and can be read or written. As used herein, "semantics" generally refer to the format of a memory object, an instruction, a command, or a signal in reference to the meaning of the memory object, instruction, command, or signal. For example, memory objects or instructions that can be understood by a first memory device may not be understood by the second memory device, and vice versa. By configuring the semantics associated with the memory object into semantics that can be understood by the first memory device or the second memory device, the memory objects can be selectively written to the first memory device or the second memory device.

As described herein, embodiments can include using a memory system including a host and memory devices that use a key value database system. A key value database is a data storage method for storing, retrieving, and managing associative arrays and a data structure which can be referred to as a dictionary or hash table, where the dictionary can include memory objects. These memory objects can be stored and retrieved using a key that uniquely identifies the record and can be used to find the data within the database, as will be described in further detail below in association with FIG. 2.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more", e.g., a number of memory banks, can refer to one or more memory banks, whereas a "plurality of" is intended to refer to more than one of such things.

Furthermore, the words "can" and "may" are used throughout this application in a permissive sense, e.g., having the potential to, being able to, not in a mandatory sense, e.g., must. The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1A, and a similar element may be referenced as 220 in FIG. 2. A group or plurality of similar elements or components may generally be referred to herein with a single element number. For example, a plurality of reference elements 117-1 to 117-2 may be referred to generally as 130. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1A is a block diagram in the form of a computing system 100 including a host 120 and an apparatus including a memory system 110 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 110 can include a storage class memory ("SCM") controller 115-1, a storage controller 115-2, an emerging memory device 130, and a non-volatile ("NV") memory device 140, which includes a flash-based memory device, as will be described below.

The SCM controller 115-1 can include a processor 117-1 (e.g., a processing device or processing unit) configured to execute instructions stored in a local memory 119-1. Likewise, the storage controller 115-2 can include a processor 117-2 (e.g., processing device or processing unit) configured to execute instructions stored in a local memory 119-2. In the illustrated example, the local memory 119-1, 119-2 of the SCM controller/storage controller 115-1, 115-2 each include an embedded memory configured to store instructions for performing various processes, operations, logic flows, and routines that control operation of the memory system 110, including handling communications between the memory system 110 and the host 120. The host 120 can communicate with the memory system 110 through a kernel 121, as will be described further below.

In some embodiments, the local memory 119-1, 119-2 can include memory registers storing memory pointers, fetched data, etc. The local memory 119-1, 119-2 can also include read-only memory (ROM) for storing micro-code. While the example memory system 110 in FIG. 1A has been illustrated as including the controllers 115-1, 115-2, in another embodiment of the present disclosure, a memory system 110 does not include a memory system controller, and can instead rely upon external control (e.g., provided by an external host, or by a processor or controller separate from the memory sub-system).

In general, the controllers 115-1, 115-2 can receive commands or operations from the host 120 and can convert the commands or operations into instructions or appropriate commands to achieve the desired access to the emerging memory device 130 and/or the NV memory device 140. The controllers 115-1, 115-2 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130, 140. The controllers 115-1, 115-2 can further include host interface circuitry to communicate with the host 120 via the physical host interface (e.g., host interface 111 in FIG. 1B). The host interface circuitry can convert the commands received from the host into command instructions to access the memory device 130 and/or the memory device 140 as well as convert responses associated with the memory device 130 and/or the memory device 140 into information for the host 120. The host 120 can designate a location in an address space for a memory object to be stored in the memory system 110. The memory system 110 can use an address space that is split between the first memory device 130 and the second memory device 140. As an example, the address space can span across both the first memory device 130 and the second memory device 140.

The host 120 can be a host system such as a personal laptop computer, a vehicle, a desktop computer, a digital camera, a mobile telephone, an internet-of-things (IoT) enabled device, or a memory card reader, graphics processing unit, e.g., a video card, among various other types of hosts. The host 120 can include a system motherboard and/or backplane and can include a number of memory access devices such as a number of processing resources, e.g., one or more processors, microprocessors, image processor, and/or some other type of controlling circuitry. One of ordinary skill in the art will appreciate that "a processor" can intend one or more processors, such as a parallel processing system, a number of coprocessors, etc. The host 120 can be coupled to a host interface (e.g., host interface 111 in FIG. 1B) of the memory system 110 by a communication channel 103. A kernel 121 of the host 120 can communicate to the host interface (e.g., host interface 111 of FIG. 1B).

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

The host 120 can be responsible for executing an operating system for a computing system 100 that includes the memory system 110. Accordingly, in some embodiments, the host 120 can be responsible for controlling operation of the memory system 110. For example, the host 120 can execute instructions, e.g., in the form of an operating system, that manage the hardware of the computing system 100 such as scheduling tasks, executing applications, controlling peripherals, etc.

The emerging memory device 130 can include a three-dimensional (3D) cross-point memory, phase-change memory, and resistive random access memory (RAM), and the NV memory device 140 can include a NAND or NOR memory device. As used herein, the term "emerging memory device" generally refers to resistive variable memory, such as 3-D cross-point (cross-point memory device, 3D XP device, etc.), phase-change memory, resistive RAM, a memory device that includes an array of self-selecting memory (SSM), ferroelectric random access memory (FeRAM), etc., or any combination thereof. Memory system 110 can be located at a location that is remote, e.g., part of a cloud database, from a host and/or from a location of a user that is accessing the memory system 110.

A non-limiting example of multiple memory devices having various types are described in FIG. 1A. Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In one example, the emerging memory device 130 is not used as a cache for the memory system and the emerging memory device 130 is not used as a cache for the NV memory device 140. In one example, an address space for each of the plurality of objects to be written to in the first memory device or the second memory device can be a contiguous address space across the first memory device and the second memory device. That is, the address space of both the emerging memory device 130 and the NV memory device 140 can make up a total address space and be used seamlessly as if the two memory devices were a same memory device. While two memory device types, e.g., emerging memory and NAND, are illustrated, embodiments are not so limited, however, and there can be more or less than two memory media types. For instance, a number of embodiments provide that memory devices that include a different type of emerging memory and/or a different type of non-volatile or volatile memory can be used. That is, for example, other types of volatile and/or non-volatile memory media devices are contemplated.

As illustrated in FIG. 1A, in a number of embodiments, the controllers 115-1, 115-2, the memory devices 130, 140, and/or the host interface (111 in FIG. 1B) can be physically located on a single die or within a single package, e.g., a managed memory application. Also, in a number of embodiments, a plurality of memory devices 130, 140 can be included on a single memory system 110. Also, in some embodiments, more than one memory device can include a same type of array of memory cells.

Figure 1B:
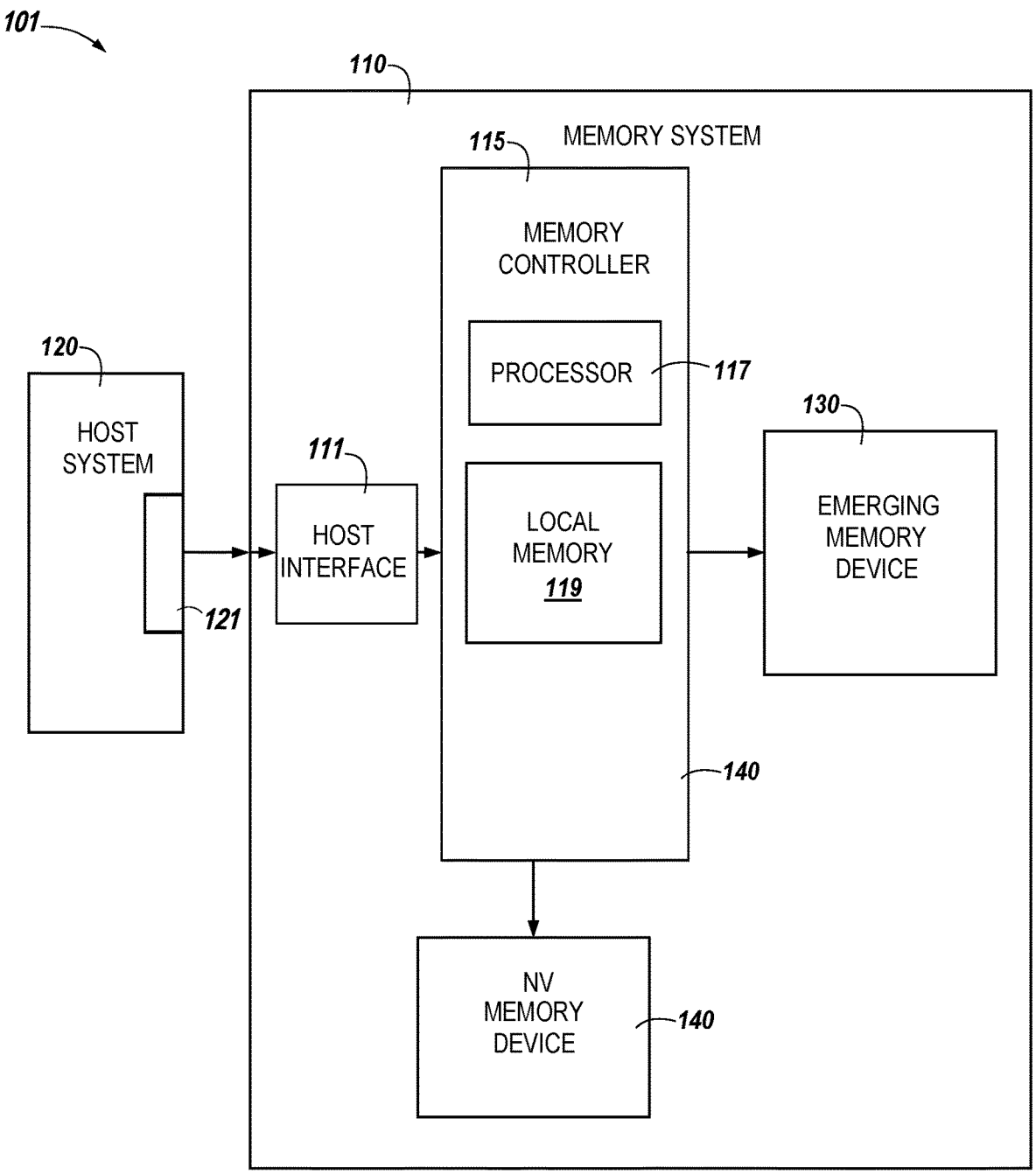
FIG. 1B is a block diagram in the form of a computing system including a controller and memory devices in accordance with a number of embodiments of the present disclosure.

FIG. 1B is a block diagram in the form of a computing system 100 including a host 120 and an apparatus including a memory system 110 in accordance with a number of embodiments of the present disclosure. The computing system 101 can be similar to computing system 100 in FIG. 1A, except that a single memory controller 115 can communicate with each of emerging memory device 130 and non-volatile ("NV") memory device 140. As an example, the memory controller 115 can generate commands and/or signals in order to read and write data to and from each of the emerging memory device 130 and NV memory device 140. The memory controller 115 can be capable of communicating with both emerging memory cells (e.g., 3D cross-point memory cells, phase-change memory cells, resistive RAM memory cells) and NV memory cells (e.g., NAND memory cells).

Further, the memory devices 130, 140 may each include respective control circuitry that the memory controller 115 communicates with in order to perform memory read and write operations within each of the memory devices 130, 140. However, embodiments are not so limited. For instance, embodiments provide that a number of memory devices include the control circuitry, while a number of different memory devices do not include the control circuitry. Operations discussed herein may be performed by the controller, the control circuitry, or combinations thereof.

Figure 2:
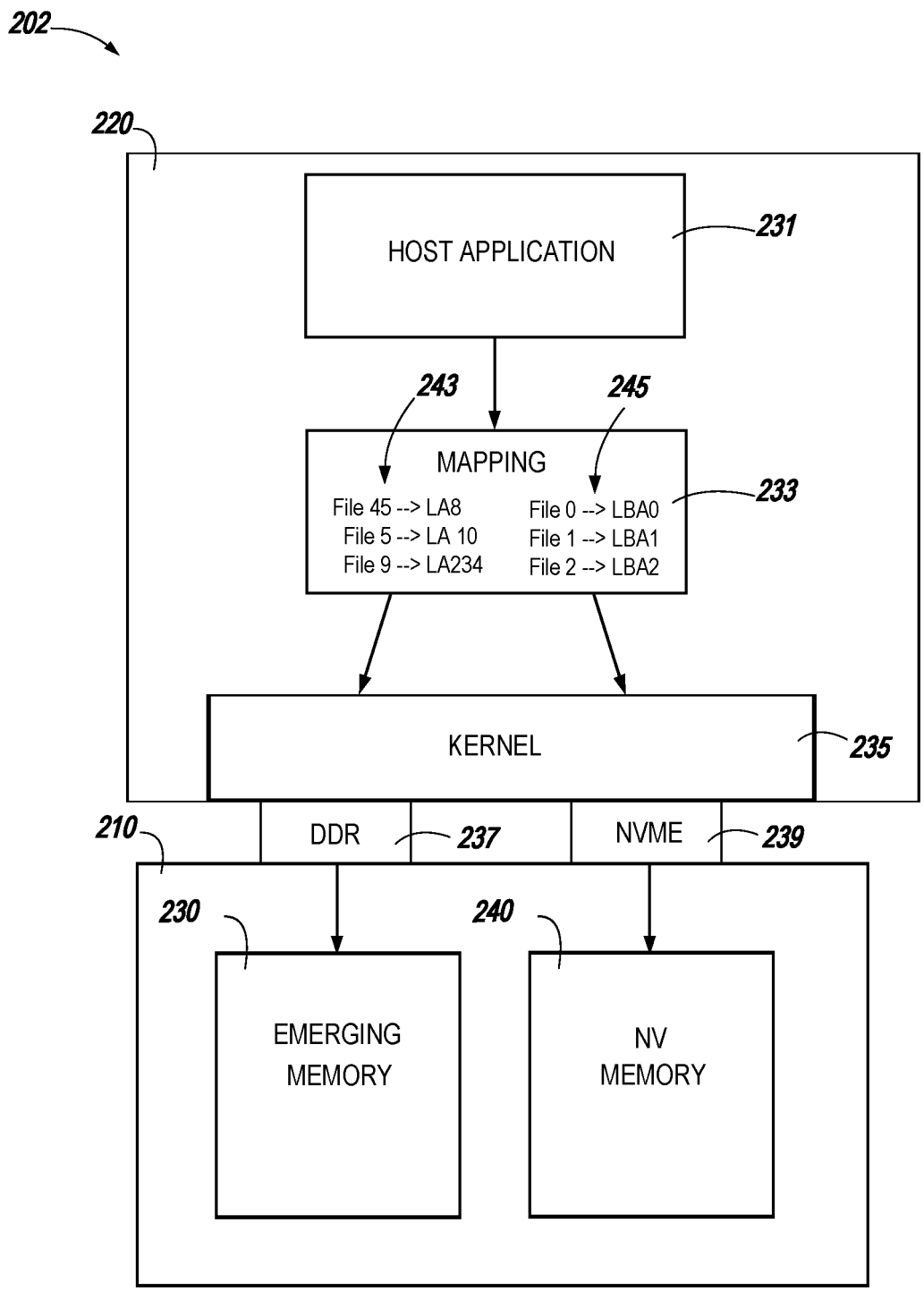
FIG. 2 is a block diagram representing object management in tiered memory systems in accordance with a number of embodiments of the present disclosure.

FIG. 2 is a block diagram 202 representing object management in tiered memory systems in accordance with a number of embodiments of the present disclosure. The block diagram 200 includes a host 220 and a memory system 210. The host 220 can be analogous to the host 120 in FIGS. 1A and 1B. The memory system 210 can be analogous to the memory system 110 in FIGS. 1A and 1B. The host 220 includes a host application 231, a mapping file system 233, and a kernel 235. The host application 231 can be using a key value database approach, as described below, to read or request data from the memory devices 230, 240 and sending or storing data in the memory devices 230, 240. The memory system 210 includes an emerging memory device 230 and a non-volatile ("NV") memory device 240.

A key value database is a type of nonrelational database that uses a key value method to store data. The key value database stores data as a collection of key value pairs in which a key serves as a unique identifier. The key value database associates a value (which can be anything from a number or simple string, to a complex object) with a key, which is used to keep track of the object. The key value database can use compact, efficient index structures to be able to locate a value by its key, making the key value database useful for systems that find and retrieve data in constant time. Both keys and values can be anything, ranging from simple objects to complex compound objects. Key value databases are partitionable and can allow horizontal scaling at scales that other types of databases may not be able to achieve.

The key value database can allow programs or users of programs to retrieve data by keys, which are essentially names, or identifiers, that point to some stored value. The key value database can be associated with a set of operations including: retrieving a value (if there is one) stored and associated with a given key, deleting the value (if there is one) stored and associated with a given key, and setting, updating, and replacing the value (if there is one) associated with a given key.

A host application 231 can request data to be stored or retrieved from a memory device, such as the emerging memory device 230 or the NV memory device 240. The mapping file system 233 can designate a key for a particular memory object and indicate a location for that memory object to either be stored or retrieved from. A first mapping list 243 can be used to designate that a memory object is stored in an emerging memory device 230 and a second mapping list 245 can be used to designate that a memory object is stored in a NV memory device 240.

As an example, as illustrated in FIG. 2, a first key (e.g., "File 45") in a first mapping list 243 can be designated as being stores as logical address 8 (e.g., "LA8"). A second key (e.g., "File 5") in the first mapping list 243 can be designated as being stored as logical address 10 (e.g., "LA10") and a third key (e.g., "File 9") can be designated as stored as logical address 234 (e.g., "LA234"). Further, a first key (e.g., "File 0"), a second key (e.g., "File 1"), and a third key (e.g., "File 2") of a second mapping list 245 can be designated as stored as logical block addresses 0, 1, and 2, respectively (e.g., "LBA 0", "LBA 1", and "LBA 2", respectively). The "LA" portion can indicate that the memory object is to be located (either stored at or retrieved from) in the emerging memory device 230 and an "LBA" portion can indicate that the memory object is to be located in the NV memory device 240. Each of these key values (e.g., "File 45," "File 5," "File 9," "File 0," "File 1," File 2") can be sent to a kernel 235 of a host (e.g., host 120 in FIGS. 1A and 1B) in order to retrieve or store the associated memory object.

While the "LA" can designate the first memory device 230 and the "LBA" can designate the second memory device 240, the address space used to address a location for a memory object can be split between, or span across, both the first memory device 230 and the second memory device 240. For example, when using a total user addressable space of 1 gigabyte (GB), the memory objects can be split 300 megabytes (MB) into the first memory device 230 and 700 MB into the second memory, 250 MB into the first memory device and 750 MB into the second memory, 900 MB into the first memory device and 100 MB into the second memory device, or any ratio. Further, for a given percentage of small data size memory objects a percentage of address space could be allocated to the first memory device and the remaining data could be allocated to the second memory device.

The kernel 235 can be software and/or code that performs operations (e.g., low level operations) and interacts with hardware and/or software components of the operating system (OS) and is controlled and/or executed by the computing system. The kernel 235 can coordinate memory, peripherals, and input/output (I/O) requests from software, translating them into data-processing instructions for the central processing unit and can connect the application software to the hardware of a computer. The kernel 235 can performs tasks, such as running processes, managing hardware devices such as the hard disk, and handling interrupts. The interface of the kernel 235 can be a low-level abstraction layer.

The kernel 235 can communicate with the emerging memory device 230 using double-data rate (DDR) software protocol 237 used to communicate with emerging memories. The kernel 235 can communicate with the NV memory device 240 using a non-volatile memory express (NVMe) software protocol 239. The NVME software protocol 239 is an open logical-device interface specification for accessing non-volatile memory media attached via PCI Express (PCIe) bus.

In some embodiments, a determination of whether to store a key and associated data in the emerging memory device 230 or the NV memory device 240 can be based on a type of characteristic set. Embodiments provide that a type of characteristic set can include one or more characteristics including, but not limited to, access frequency, memory access size (e.g., a quantity of bits associated with a memory object), and/or whether a memory access includes sequential or non-sequential accesses. For example, a memory object accessed with a first access frequency during a particular period of time that is greater than a second access frequency during a particular period of time can be stored in the emerging memory device 230. As an example, a higher access frequency can include several times a day, several times a week, etc. A lower access frequency can include once a month, once a year, etc. A more frequently accessed memory object can be referred to as "hot" and can refer to a memory object that is updated more frequently by the host and/or other external devices. A memory object accessed with the second access frequency can be stored in the NV memory device 240. The memory object with the second access frequency can be referred to as "cold" and can refer to a memory object that is updated less frequently by the host and/or external device. In this way, an access frequency can be used to designate whether the key value pair of the memory object indicates whether to indicate an "LA" (and store in the emerging memory device 230) or indicate an "LBA" (and store in the NV memory device 240).

Further, access frequency can indicate how often an associated address space is accessed during a particular time interval. Embodiments provide that for a first characteristic set, the particular time interval can be smaller, i.e., a shorter time passage, as compared to time intervals for a second characteristic set. The particular time interval can have various values, e.g., for different applications. As an example, a stock account database can be frequently updated or accessed as data may change quickly. A health database can be less frequently updated or accessed as the data may be updated when a patient visits a healthcare facility, etc. In one example, such as an aviation database, a hybrid of both small, frequently updated memory objects (e.g., such as with data associated with flight tracking coordinates), and large, less frequently updated memory objects (e.g., such as with maintenance data) can be accessed.

As a further example, the particular time intervals may be 5 microseconds, 10 microseconds, 1 second, 1 minute, a day, a month, a year, among other values. Further, embodiments provide that the particular time interval may change over time, e.g., based upon changing workloads, benchmarks, and/or the host data traffic behavior, for instance. Generally, a greater access frequency will make a memory object more "hot," as compared to another memory object having a lesser access frequency, which may be more "cold." In other words, a memory object with greater or the greatest access frequency will generally have the first designation (and be stored in the emerging memory device 230) and memory objects with lower or the least access frequency will generally be stored in the NV memory device 240.

Embodiments provide that a type of characteristic set can include one or more characteristics including, but not limited to, a size of a memory object, access frequency, a type of key value data, etc. For example, a memory object with a first data size greater than a second data size can be stored in the emerging memory device 230. An example, a smaller data size can include 1 kilobyte (KB), 2 KB, 4 KB, 16 KB. As an example, a larger data size can include data sizes ranging from 16 KB to several gigabytes (GBs). A memory object accessed with the second data size can be stored in the NV memory device 240. This can be particularly useful when using hybrid workloads that can run more efficiently when optimized for both large data blocks (e.g., writing to a NAND memory device in the description herein) and smaller data segments (e.g., writing to a emerging memory device in the description herein). In this way, a data size can be used to designate whether the key value pair of the memory object indicates whether to indicate an "LA" (and store in the emerging memory device 230) or indicate an "LBA" (and store in the NV memory device 240). While examples describe storing initially in the emerging memory device 230 or the NV memory device 240, embodiments are not so limited.

For example, a memory object can be initially stored in the emerging memory device 230 and can be sent to a host and expanded to include a larger memory object (but still associated with a same key) and be subsequently stored in the NV memory device 240. Likewise, a memory object can be initially stored in the emerging memory device 230 and can be sent to a host and then be accessed with less frequency and subsequently stored in the NV memory device 240. The size of the memory object can correspond to a quantity of bits or other information contained within the memory object. Generally, a smaller size will make a memory object more "hot," as compared to another memory object having a greater size, as the memory object may also be accessed more frequently if it is smaller.

Embodiments provide that memory objects may change designations over time. Over time, the type of characteristic set associated with a memory object may change. In other words, over time one or more characteristics associated with a memory object may change. For instance, the access frequency of a memory object over a short-term time interval may decrease over time or a data size of a memory object may increase or decrease over time. As an example, a decrease in access frequency may contribute to that memory object becoming less "hot," as compared to the memory object prior to the decrease in access frequency. As such, this decrease can result in the memory objects being transferred from one memory device type to another.

Embodiments provide that a type of characteristic set can include one or more characteristics including, but not limited to, a size of a memory object, an access frequency, and/or a type of key value data. For example, a key of a memory object can be stored in the emerging memory device 230 and data associated with the key can be stored in the NV memory device 240. At this point, in this example, the key value data may no longer be a memory object as a memory object in a key value database includes both the key and the data associated with the key. In this way, a key value data type can be used to designate whether the key value pair indicates whether to indicate an "LA" (and store in the emerging memory device 230) or indicate an "LBA" (and store in the NV memory device 240). A hash table used to associate the key with the data can be stored in the emerging memory device 230 as well. In this way, a determination of whether to locate data in the NV memory device 240 can be performed quickly.

Further, updates to the keys can be stored in the emerging memory device 230 in a cached update table during a foreground operation, e.g., while the memory system is performing additional operations. Updates to the data in the NV memory device 240 associated with the updated keys (stored in the emerging memory device 230) can be performed in the background using the cached update table, e.g., while the memory device is not performing additional operations, is in a sleep mode, or other reduced power state, etc. In this way, memory resources can be preserved for operations currently being performed and used for updating the data to the NV memory device 240 when the operations have completed.

Figure 3:
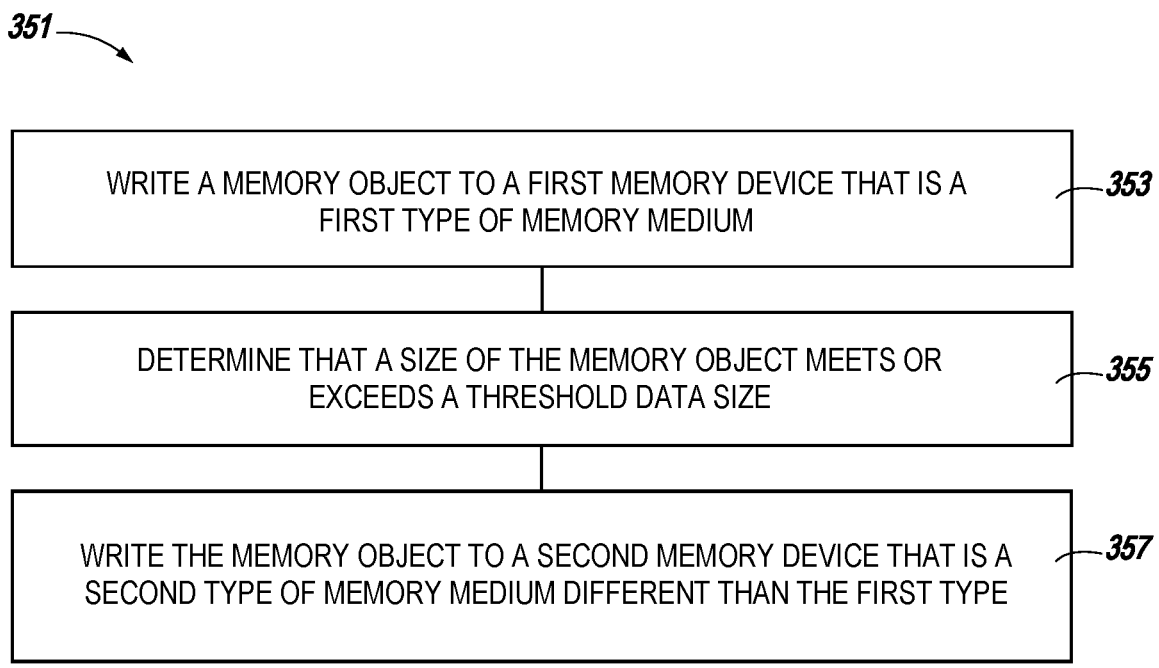
FIG. 3 is a flow diagram representing an example method for object management in tiered memory systems in accordance with a number of embodiments of the present disclosure.

FIG. 3 is a flow diagram 351 representing an example method for object management in tiered memory systems in accordance with a number of embodiments of the present disclosure. The method 351 can be performed by processing logic that can include hardware, e.g., processing device, circuitry, dedicated logic, programmable logic, microcode, hardware of a device, integrated circuit, etc., software, e.g., instructions run or executed on a processing device, or a combination thereof. In some embodiments, the method 351 is performed by a processor of the host 120 in FIG. 1A. In some embodiments, the method 351 is performed by control circuitry of the host 120, illustrated in FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 353, the method 351 can include writing a memory object to a first memory device. The first memory device can be analogous to the first memory device 130 and 230 in FIGS. 1A/1B and 2, respectively. The first memory device can be a first type of memory medium including an emerging memory such as cross-point memory, phase-change memory, and resistive RAM, etc. The second memory device can be analogous to the second memory device 140 and 240 in FIGS. 1A/1B and 2, respectively. The second memory device can be a second type of memory medium including a non-volatile memory including NAND Flash or NOR Flash. The flash-based memory device can be a NAND memory device or a NOR memory device. In some examples, writing the memory object can include initially writing the memory object to an emerging memory device.

At block 355, the method 351 can include determining that a size of the memory object is equal to or exceeding a threshold data size. As an example, the threshold data size can be a page size (such as a NAND page size or NOR page size). The size of the memory object can then be determined to be equal to or greater than (exceeding) a page size.

At block 357, the method 351 can include writing the memory object to the second memory device. For example, data stored to the first memory device can be written to (or transferred to) the second memory device. The memory object can be written in response to a data size of the memory object being equal to or greater than a threshold data size. As an example, the memory object can be written from the first memory device to the second memory device in response to the memory object being equal to or greater than 16 kilobytes (KBs) (which in some examples can refer to a page size). Put another way, data can be written to a first memory device (e.g., cross-point memory device) until the data reaches a data size equal to a page size of a second memory device (e.g., a flash-based memory device), at which point the data can be written to (or transferred to) the second memory device (e.g., the flash-based memory device).

In another example, the particular memory object can be transferred from the second memory device to the first memory device in response to data associated with the particular one memory object being less than 16 KBs. The data can be transferred from a flash-based memory device to a cross-point memory device so that a host requesting access to the data can access a smaller data size than a full page size. In response to the data being equal to a page size, the data can remain in the flash-based memory device and be accessed by the host from the flash-based memory device.

Figure 4:
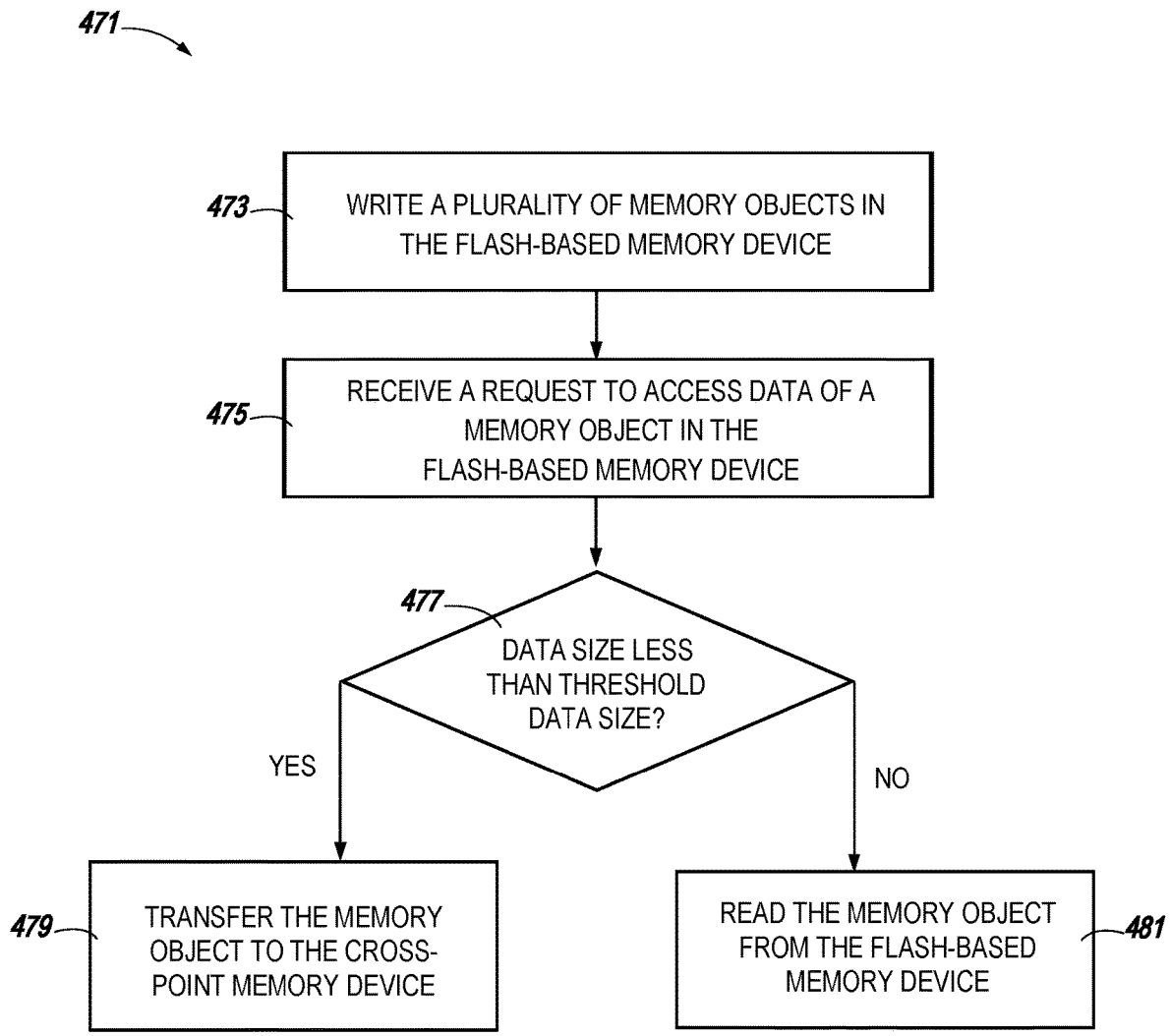
FIG. 4 is a flow diagram representing an example of object management in tiered memory systems in accordance with a number of embodiments of the present disclosure.

FIG. 4 is a flow diagram 471 representing an example of object management in tiered memory systems in accordance with a number of embodiments of the present disclosure. The operations of the flow diagram 471 can be performed by processing logic that can include hardware, e.g., processing device, circuitry, dedicated logic, programmable logic, microcode, hardware of a device, integrated circuit, etc., software, e.g., instructions run or executed on a processing device, or a combination thereof. In some embodiments, the method is performed by a processor of the host 120 in FIG. 1A. In some embodiments, the method is performed by control circuitry of the host 120, illustrated in FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 473, a plurality of memory objects can be written to a flash-based memory device. At operation 475, a request to access data of a memory object in the flash-based memory device can be received. The request can be sent by a host to a controller of a memory system that includes the flash-based memory device. Example data sizes can include 1 kilobyte (KB), 2 KB, 4 KB, 16 KB, and can also range from 16 KB to several gigabytes (GBs)).

At operation 477, whether the data size is less than a threshold data size can be determined. In response to the data size being less than the threshold data size (indicated by "YES"), as illustrated at operation 479, the memory object can be transferred to a cross-point memory device. The data transferred to the cross-point memory device can be accessed in the cross-point memory device by a host. The host can request to access a portion of data that may be a portion of a full page size of data. The data accessed by the host can be a portion of data that would have been accessed due to an entire page size of data that may have been read had the data remained in the flash-based memory device. That is, the host can access data requested to be accessed while not accessing data that would have been part of a full page of data had the data remained in the flash-based memory device. In response to the data size being equal to or greater than the threshold data size (indicated by "NO"), as illustrated at operation 481, the memory object can be read from the flash-based memory device. In this instance, the memory object can be read from the flash-based memory device without transferring the memory object to the cross-point memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   writing a memory object to a first memory device that comprises a first type of memory medium, wherein:
      the memory object is associated with a first key of a key-value database structure that is associated with the first memory device; and
      the first key is stored in the first memory device;
   determining:
      that a size of the memory object meets or exceeds a threshold data size;
      an access frequency of the memory object is below a threshold access frequency; and
      that the memory object is accessed in a non-sequential manner;
   writing the memory object to a second memory device that comprises a second type of memory medium different than the first type in response to the determinations by:
      retrieving the first key from the first memory device to locate the memory object in the first memory device;
      deleting the first key; and
      associating the memory object with a second key associated with the second memory device and storing the second key in the first memory device, wherein the second key indicates where the memory object is stored in the second memory device, wherein:
the first memory device and the second memory device are external to a host; and
the first type of memory medium is a non-volatile memory comprising phase-change memory or resistive random access memory (RAM) and the second type of memory medium comprises NAND Flash or NOR Flash.

2. The method of claim 1, wherein an address space of the first memory device and the second memory device is contiguous across both the first memory device and the second memory device.

3. The method of claim 1, wherein writing the memory object comprises initially writing the memory object to the first memory device.

4. The method of claim 3, wherein writing the memory object to the second memory device comprises writing the memory object to the second memory device in response to the size of the particular one memory object reaching a page size associated with the second memory device.

5. The method of claim 4, wherein the page size is a NAND page.

6. The method of claim 4, wherein the page size is 16 kilobytes (KBs).

7. The method of claim 1, wherein the memory object is written to the second memory medium in response to the host writing data to the first memory medium that exceeds the threshold data size.

8. The method of claim 1, wherein the threshold data size is a data size of a flash-based memory page.

9. A system, comprising:
a first memory device that comprises a first type of memory medium, the first type of memory medium is a non-volatile memory comprising phase-change memory or resistive random access memory (RAM);
a second memory device that comprises a second type of memory medium, the second type of memory medium comprising NAND Flash or NOR Flash;
wherein the first memory device and the second memory device are external to a host; and
a controller coupled to the first memory device and the second memory device, the controller configured to:
write a plurality of memory objects to the first memory device, wherein the plurality of memory objects are each associated with a first set of keys of a key-value database structure associated with the first memory device and the first set of keys are stored in the first memory device;
determine:
whether a size of data of any of the plurality of memory objects exceeds a threshold data size;
whether an access frequency of any of the plurality of memory objects exceeds a threshold access frequency; and
whether any of the plurality of memory objects are accessed in a non-sequential manner;
in response to the respective sizes of the data of the respective plurality of memory objects being less than the threshold data size and the respective access frequencies of the respective plurality of memory objects being greater than the threshold access frequency, maintaining the respective memory objects in the first memory device; and
in response to the respective sizes of the data of the respective plurality of memory objects being greater than the threshold data size and the respective access frequencies of the respective plurality of memory objects being less than the threshold access frequency, writing the respective memory objects to the second memory device by:
deleting a respective key of the first set of keys associated with the respective memory objects from the first memory device; and
associating the respective memory objects with a second set of keys associated with the second memory device; and
storing the second set of keys in the first memory device.

10. The system of claim 9, wherein an address space to store each of the plurality of memory objects contiguously spans across the second memory device and the first memory device.

11. The system of claim 9, wherein, in response to one of the plurality of memory objects associated with the data being written to the second memory, the controller is configured to access a portion of the one memory object including the data in the second memory device.

12. The system of claim 9, wherein the host is configured to send a request for the data stored in the second memory device to the controller.

13. The system of claim 9, wherein the host is further configured to, in response to the memory objects associated with the data being written to the second memory device, receive the data via the controller from the second memory device.

14. The system of claim 9, wherein a physical address space to store each of the plurality of memory objects contiguously spans across the first memory device and the second memory device.

15. The system of claim 9, wherein the first memory device is not used as a cache in the memory system nor in the second memory device.

16. The system of claim 9, wherein the host is configured to enable a memory object of the plurality of memory objects to be sent to the first memory device using a double-data rate (DDR) protocol and to the second memory device using a flash-based memory express (NVME) protocol.

17. A system, comprising
a first memory device comprising a first type of memory medium;
a second memory device comprising a second type of memory medium;
wherein the first memory device and the second memory device are external to a host; and
a controller coupled to the first device and the second memory device and configured to:
write each of a plurality of memory objects to the first memory device, wherein the plurality of memory objects are each associated with a first set of keys of a key-value database structure associated with the first memory device and the first set of keys are stored in the first memory device; and
in response to a size of a particular one of the plurality of memory objects reaching a page size of the second memory device, writing the particular one memory object to the second memory device; or
in response to an access frequency of the particular one of the plurality of memory objects being below a threshold access frequency, writing the particular one memory object to the second memory device;

wherein:
writing the particular one memory object to the second memory device comprises:
retrieving a key of the first set of keys associated with the particular one memory object from the first memory device to locate the particular one memory object in the first memory device;
deleting the key of the first set of keys associated with the particular one memory object from the first memory device; and
associating the particular one memory object with a key of a second set of keys associated with the second memory device and storing the key of the second set of keys in the first memory device, wherein the key of the second set of keys indicates where the particular one memory object is stored in the second memory device;
the first type of memory medium is a non-volatile memory comprising phase-change memory or resistive random access memory (RAM); and the second type of memory medium comprise NAND Flash or NOR Flash.

18. The system of claim 17, wherein the controller is configured to:
in response to a size of a particular one of the plurality of memory objects remaining below a page size of the second memory device, maintaining the particular one memory object in the first memory device; or
in response to an access frequency of the particular one of the plurality of memory objects being above a threshold access frequency, maintaining the particular one memory object in the first memory device.

19. The system of claim 17, wherein the page size is a NAND page size.

20. The system of claim 17, wherein the controller is configured to write the plurality of memory objects to the first memory device using the key value database structure that includes the first set of and the second set of keys.

* * * * *